United States Patent [19]

Kito

[11] Patent Number: 5,184,898
[45] Date of Patent: Feb. 9, 1993

[54] BALL RETAINER FOR LINEAR BEARINGS
[75] Inventor: Fusao Kito, Yamanashi, Japan
[73] Assignee: THK Co., Ltd., Tokyo, Japan
[21] Appl. No.: 884,345
[22] Filed: May 18, 1992
[51] Int. Cl.$^5$ .............................................. F16C 29/06
[52] U.S. Cl. ...................................................... 384/43
[58] Field of Search ...................................... 384/43–45

[56] References Cited

U.S. PATENT DOCUMENTS

| | | | |
|---|---|---|---|
| 4,204,717 | 5/1980 | Ernst et al. | 384/43 |
| 4,206,951 | 6/1980 | Ernst et al. | 384/43 |
| 4,339,157 | 7/1982 | Olschewski et al. | 384/43 |
| 5,051,001 | 9/1991 | Jacob | 384/43 |

FOREIGN PATENT DOCUMENTS 62-33140 8/1987 Japan .
63-6507 2/1988 Japan .

Primary Examiner—Thomas R. Hannon
Attorney, Agent, or Firm—Armstrong, Westerman, Hattori, McLeland & Naughton

[57] ABSTRACT

A ball retainer to be used in a linear bearing of a ball bush, a ball spline or the like. The ball retainer is formed with endless ball guide races for guiding balls smoothly and can be easily assembled in a bearing outer cylinder. The ball retainer is constructed to comprise: a retainer body fitted in a hollow portion from one opening of the bearing outer cylinder which moves linearly around a bearing shaft; and an annular piece fitted in the hollow portion from the other opening. The ball retainer is characterized in that its outer shape is configured with the inner shape of the bearing outer cylinder when the annular piece is fixed on the leading end portion of the retainer body.

2 Claims, 8 Drawing Sheets

BALL RETAINER FOR LINEAR BEARINGS

BACKGROUND OF THE INVENTION

1. Field of the Invention

The present invention relates to a ball retainer adapted to be used in a linear bearing of a ball spline, a ball bush or the like for retaining and arraying balls held between a bearing outer cylinder and a bearing shaft and, more particularly, to an improvement in the shape of the ball retainer for circulating the balls smoothly.

2. Description of the Prior Art

The ball retainer of this kind generally known in the prior art is exemplified by a ball retainer 60 of a ball spline, as shown in FIG. 9.

This ball retainer 60 is molded into a generally cylindrical thin shape having a hollow portion 61, in which a spline shaft (although not shown) is loosely fitted. Specifically, the ball retainer 60 is formed in its outer circumference 62 with a plurality of endless ball guide races, each of which is composed of: elongated loaded ball guide races 64 for rolling loaded balls 63 held between a spline outer cylinder 70 and the spline shaft; unloaded ball guide races 66 for loading unloaded balls 65; and ball turning races 67 for connecting the loaded ball guide races 64 and the unloaded ball guide races in communication. Moreover, this ball retainer 60 is fitted for use in the hollow portion of the spline outer cylinder 70 after its endless ball guide races have been arrayed with the loaded balls 63 and the unloaded balls 65.

Considering the assembly efficiency of the ball spline, the ball retainer thus constructed and used is integrally injection-molded of a synthetic resin and is assembled with the spline outer cylinder 70 by inserting it into the hollow portion from one opening of the spline outer cylinder 70.

Incidentially, this spline outer cylinder 70 has its inner circumference divided into: a loaded ball region for holding the loaded balls 63 together with the spline shaft; and a pair of ball scoop regions 68 positioned axially adjacent to the loaded ball region. The loaded ball region is formed axially of the spline outer cylinder 70 with a plurality of ridges 71 for holding the loaded balls 63 between themselves and the spline shaft. On the other hand, the aforementioned ball scoop regions 68 are formed to have such an equal internal diameter that the loaded balls 63 are released in the ball scoop regions 68 from the clearances between the aforementioned ridges 71 and the spline shaft.

In order to fit the integrally molded ball retainer 60 in the hollow portion of the spline outer cylinder 70, therefore, the shape of the outer circumference of the ball retainer 60 has to be configured with the sectional shape of the loaded ball regions formed with the ridges 71. For this reason, the ball retainer 60 is given an axially uniform sectional shape (as shown in FIG. 9).

However, this sectional shape raises the following disadvantages. At first, if the ball retainer 60 has its sectional shape made identical to that of the load ball regions, the aforementioned ball turning races 67 are partially (as indicated at A in FIG. 9) shallowed so much that the rolling runs of the unloaded balls 65 are liable to grow unstable. Since, moreover, the ball turning races 67 correspond to the ball scoop regions 68 of the spline outer cylinder 70, clearances are established between the spline outer cylinder 70 and the ball retainer 60 in the ball scoop regions 68 to make unstable the rolling runs of the unloaded balls 65 in the aforementioned A portions.

As a result, at the time of the high-speed or vertical movements of the spline outer cylinder 70, the unloaded balls 65 are liable to come out of the ball turning races 67 so that they interfere with each other, as shown in FIG. 10, to clog the ball turning races 67. Thus, there rises another problem that the balls cannot circulate any more.

SUMMARY OF THE INVENTION

The present invention has been conceived to solve such problems and has an object to provide a ball retainer which has endless ball guide races capable of guiding balls smoothly along predetermined tracks and which can be easily assembled with a bearing outer cylinder.

In order to achieve the above-specified object, according to the present invention, there is provided a ball retainer fitted in the hollow portion of a bearing outer cylinder, which can move linearly around a bearing shaft, for retaining and arraying balls held between the bearing outer cylinder and the bearing shaft, which retainer comprises: a retainer body including: a smaller-diameter portion adapted to be fitted in a loaded ball region of the bearing outer cylinder, which is formed with a plurality of axially extending ridges for holding said balls together with the bearing shaft; a larger-diameter portion formed at one end of the smaller-diameter portion and so fitted in a ball scoop region of the bearing outer cylinder adjacent to the loaded ball region that it is axially retained by the ridges; and a leading end portion formed at the other end of the smaller-diameter portion to have a diameter equal to or smaller than that of the smaller-diameter portion for forming a clearance with the inner circumference of the bearing outer cylinder in another ball scoop region of the bearing outer cylinder, the smaller-diameter portion being formed in its outer circumference with loaded ball guide races and unloaded ball guide races corresponding to loaded ball rolling faces and unloaded ball races, which are formed in the inner circumference of the bearing outer cylinder, the larger-diameter portion and the leading end portion being formed in its outer circumferences with ball turning races for connecting the loaded ball guide races and the unloaded ball guide races in communication; and an annular piece formed with semicircular cut portions corresponding to the ball turning races and fixed on the outer circumference of the leading end portion of the retainer body for occupying the clearance between the leading end portion and the inner circumference of the bearing outer cylinder.

BRIEF DESCRIPTION OF THE DRAWINGS

Other objects, advantages and features of the present invention will become apparent from the following description to be made with reference to the accompanying drawings, in which.

DESCRIPTION OF THE PREFERRED EMBODIMENTS

A ball retainer in a linear bearing in accordance with the present invention will be described in detail in the following with reference to the accompanying drawings.

Figure 1:
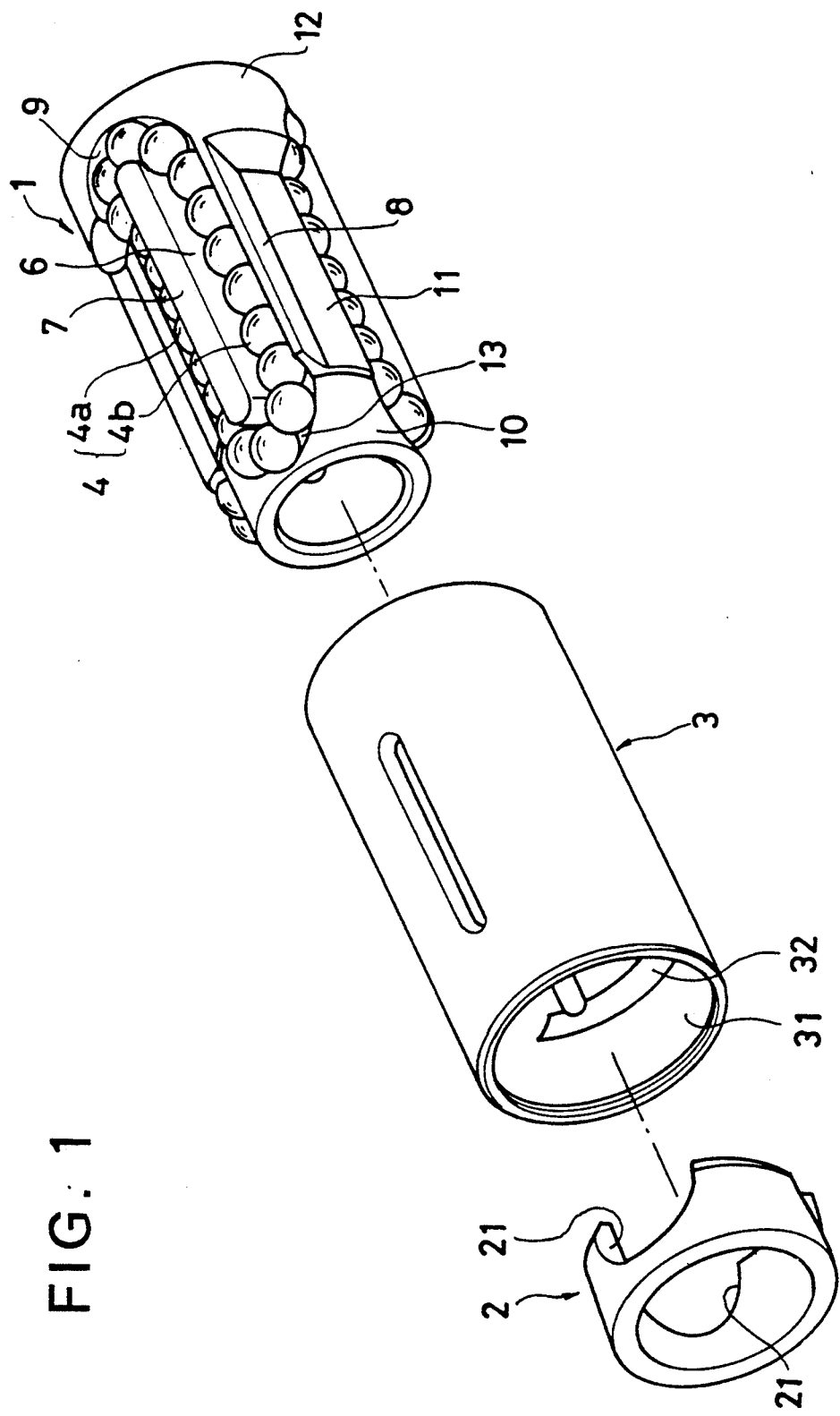
FIG. 1 is an exploded perspective view showing the state, in which a ball retainer according to a first embodiment of the present invention is assembled.
Figure 2:
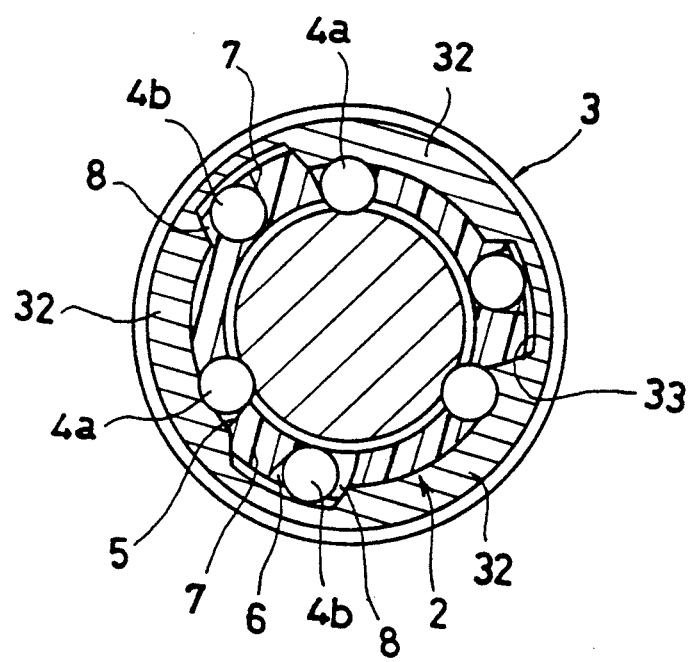
FIG. 2 is a section showing the assembled state of the ball retainer according to the first embodiment.
Figure 3:
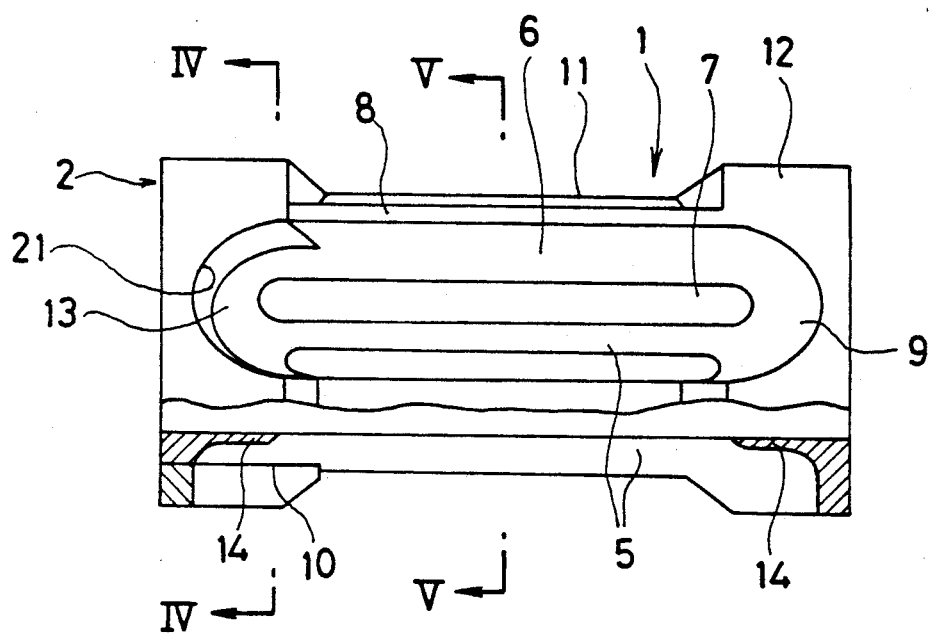
FIG. 3 is a side elevation showing the ball retainer according to the first embodiment.

FIG. 1 is an exploded perspective view showing a ball retainer of a ball spline, to which the present invention is applied. This ball retainer is constructed to include a retainer body 1 fitted in the hollow portion of a spline outer cylinder 3 (as will be shortly referred to as the "outer cylinder") from one opening of the same, and an annular piece 2 fitted in the hollow portion from the other opening of the outer cylinder 3.

First of all, the retainer body 1 is composed of: a smaller-diameter portion 11 fitted in a loaded ball range of the outer cylinder 3; a larger-diameter portion 12 formed to extend from one end of the smaller-diameter portion 11 and fitted in a ball scoop region 31 of the outer cylinder 3; and a leading end portion 10 formed to extend from the other end of the smaller-diameter portion 11 and positioned in the ball scoop region 31 of the outer cylinder 3. The retainer body 1 is injection-molded of a synthetic resin to have a substantially equal total length as that of the outer cylinder 3.

Figure 5:
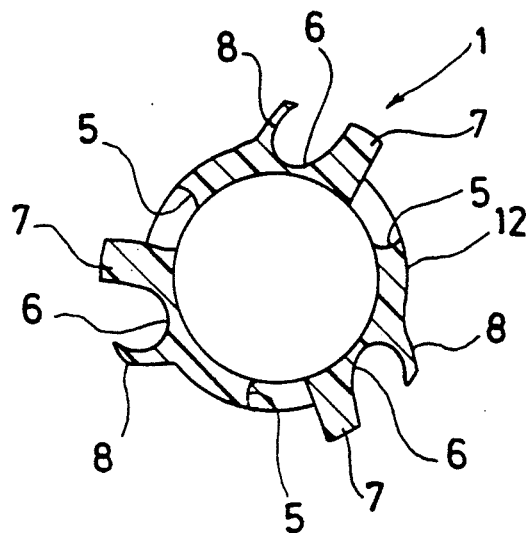
FIG. 5 is a section taken along line V—V of FIG. 3.

FIG. 5 shows a section of the aforementioned smaller-diameter portion. This smaller-diameter portion 11 is formed with: loaded ball guide races 5 of elongated window shape for guiding loaded balls 4a between the outer cylinder 3 and the spline shaft (although not shown); and unloaded ball guide races 6 for rolling unloaded balls 4b. These two guide races 5 and 6 are partitioned by islands 7, and the unloaded ball guide races 6 are formed at their one sides with banks 8, which face the islands 7 and extend from the larger-diameter portion 12, for enclosing and guiding the unloaded balls 4b rolling in the unloaded ball guide races 6. As shown in FIG. 1, moreover, those islands 7 and the banks 8 are fitted in unloaded ball races 33 which are formed between a plurality of ridges 32 of the outer cylinder 3. Moreover, the loaded ball guide races 5 are formed at their two ends with tongues 14 for scooping the loaded balls 4a having rolled in said races 5 up to ball turning races 9 and 13.

Figure 6:
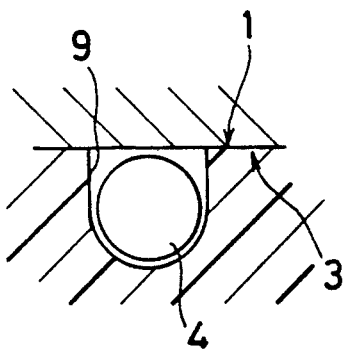
FIG. 6 is a section showing a ball turning race in a larger-diameter portion of a retainer body.

As shown in FIG. 6, on the other hand, the aforementioned larger-diameter portion 12 is formed with the deeper ball turning races 9 for wrapping and guiding the unloaded balls 4b like the aforementioned unloaded ball guide races 6. Each of the ball turning races 9 connects one end of the loaded ball guide race 5 and one end of the unloaded ball guide race 6 in communication.

Moreover, the aforementioned leading end portion provides a seat having its outer circumference fitting the aforementioned annular piece 2 therein. This leading end portion 10 is formed with the ball turning races 13 for connecting the loaded ball guide races 5 and the unloaded ball guide races 6 in communication.

On the other hand, the annular piece 2 is a ringshaped member having its internal diameter for fitting the outer circumference of the leading end portion 10 therein. The annular piece 2 is formed, as shown in FIG. 1, with semicircular cut portions 21 which correspond to the ball turning races 13 formed in the leading end portion 10 of the retainer body 1. The cut portions 21 are provided in the number corresponding to the ball tracks and arranged at an equal distance.

Moreover, the ball retainer thus constructed according to the present embodiment is assembled with the outer cylinder by fitting the retainer body in the hollow portion from one opening of the outer cylinder, by fitting the annular piece 2 in the hollow portion from the other opening, and by fixing the annular piece 2 on the leading end portion 10 of the retainer body 1.

Figure 4:
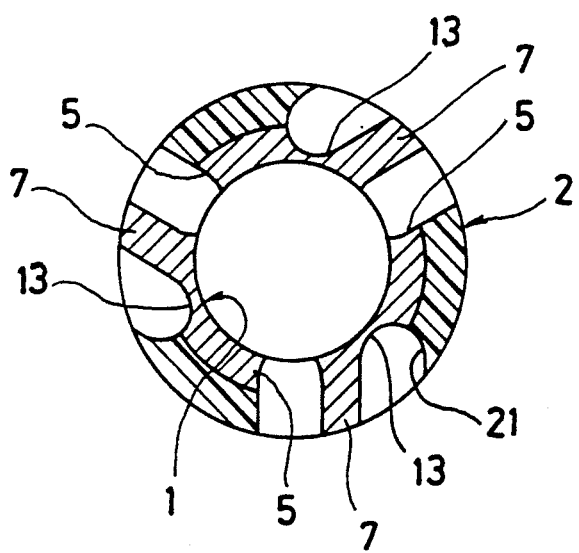
FIG. 4 is a section taken along line IV—IV of FIG. 3.
Figure 7:
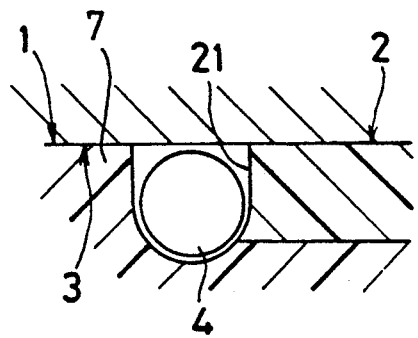
FIG. 7 is a section showing the ball turning race in a seat of the retainer body.

FIG. 6 shows the behavior, in which the unloaded ball 4b is rolling in the ball turning race 9 formed in the larger-diameter portion 12. The unloaded balls 4b are completely sealed by both the ball turning races 9 formed in the retainer body 1 and the outer cylinder 3 so that they can roll smoothly in the ball turning races 9 without coming out of these races 9. On the other hand, the ball turning races 13 formed in the leading end portion 10 are made deep and defined, as shown in FIGS. 4 and 7, by the islands 7 of the retainer body 1 and the cut portions 21 of the annular piece to have sections identical to those of the ball turning races 9 shown in FIG. 6. As a result, the unloaded balls 4b to roll in the ball turning races 13 can roll smoothly in the ball turning races 13 without coming out these races 13.

Thus, in the ball retainer of the present embodiment, the deep ball circulating tracks for connecting the two ends of the loaded ball guide races 5 in communication are completed, when the annular piece 2 is fixed in the retainer body 1, so that the unloaded balls 4b scooped up from the load ball guide races 5 can circulate smoothly.

Figure 8:
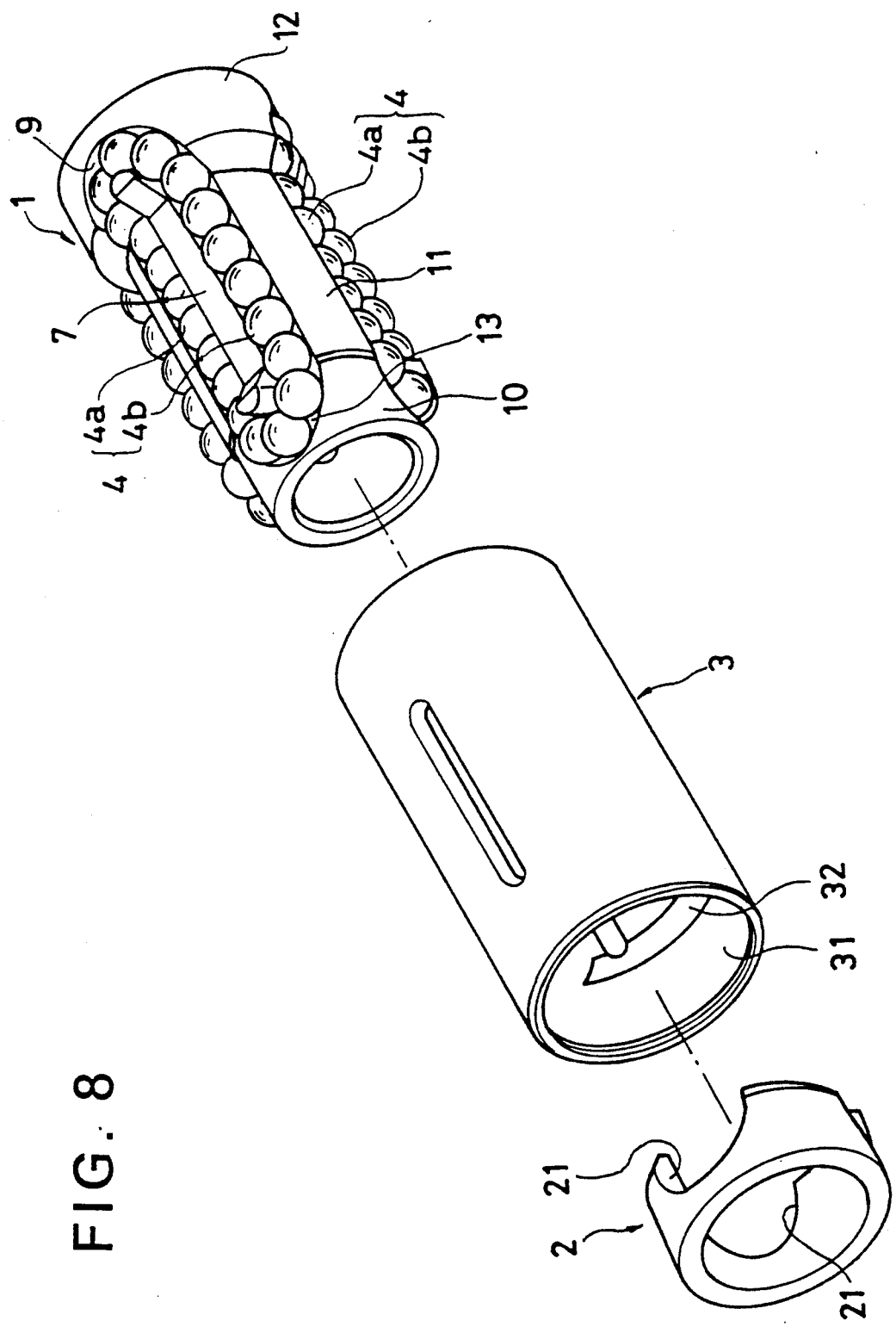
FIG. 8 is an exploded perspective view showing an assembled state of a ball retainer according to a second embodiment of the present invention.
Figure 9:
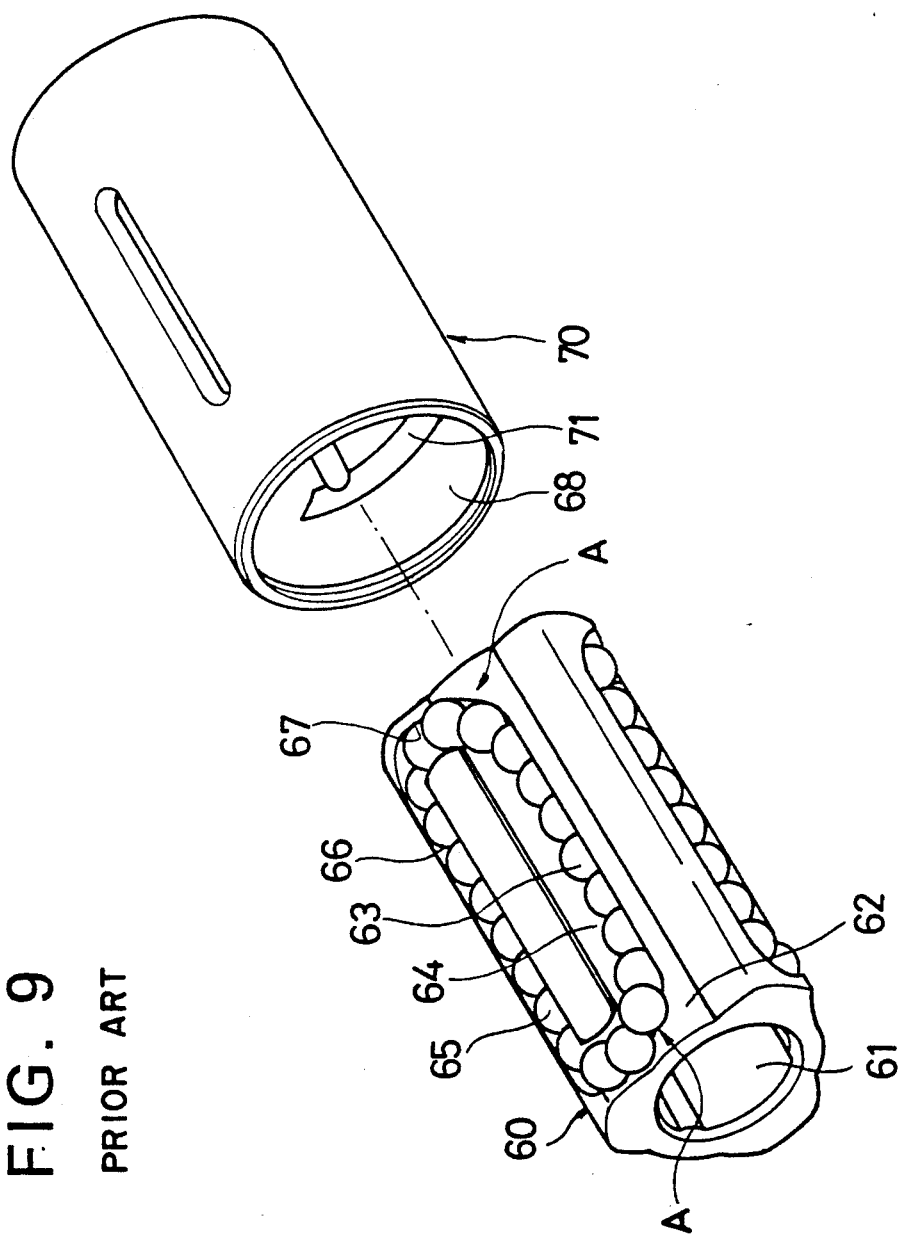
FIG. 9 is an exploded perspective view showing the assembled state of the ball retainer of the prior art.
Figure 10:
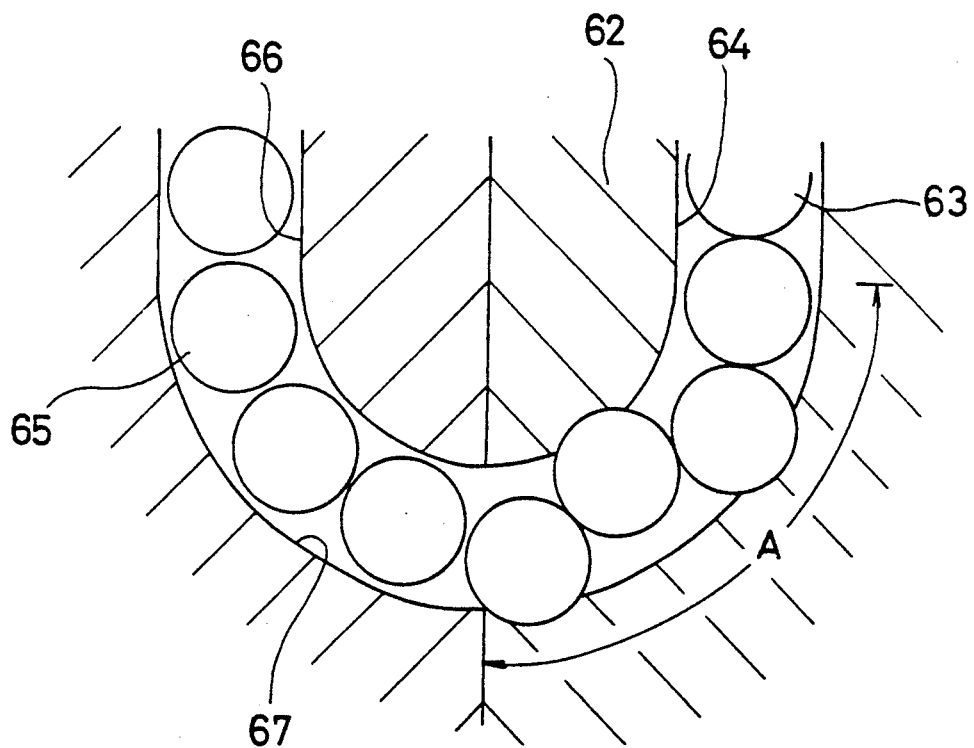
FIG. 10 is an enlarged view for explaining the problems in the ball retainer of the prior art.

Next, FIG. 8 shows a second embodiment of the present invention.

This embodiment takes a structure substantially similar to that of the foregoing first embodiment. Since the smaller-diameter portion 11 of the retainer body 1 is cut by a lathe, it has its center portion of the islands 7 and its banks 8 cut away.

As a result, the unloaded ball guide races 6 are made shallow, but the ball turning races 9 and 13 are made deep like the first embodiment so that the balls 4 can be arrayed in the predetermined tracks and smoothly guided from the loaded ball guide races 5 to the unloaded ball guide races 6.

Here in FIG. 8, the components similar to those of FIG. 1 are designated at the common reference numerals, and their descriptions will be omitted.

In the first and second embodiments thus far described, moreover, the description is directed to the case, in which the present invention is applied to the ball spline having three ball tracks, but the present invention can also be applied to any ball spline irrespective of the number of ball tracks.

Figure 11:
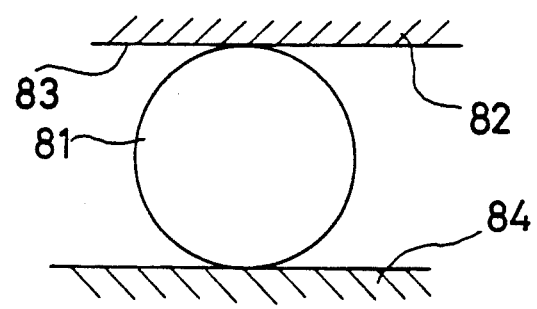
FIG. 11 is a section showing a ball contacting state in a ball bush, to which the ball retainer of the present invention can be applied.
Figure 12:
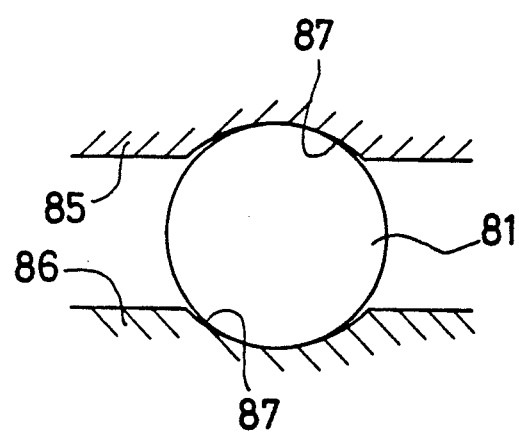
FIG. 12 is a section showing a ball contacting state in a ball spline, to which the ball retainer of the present invention can be applied.

Incidentally, the linear bearing, to which the present invention can be applied, is a bearing for bearing the relative linear movements between the cylindrical bearing outer cylinder and the bearing shaft by holding a plurality of balls circulating endlessly inbetween. This bearing is exemplified by: a ball bushing in which a ball 81 can bear a load while contacting in point-to-point relation with a loaded ball rolling face 83 formed on the inner circumference of a baring outer cylinder 82 and the outer circumference of a bearing shaft 84, as shown in FIG. 11; and a ball spline in which the ball 81 can bear the load while contacting in point-to-point relation with a bearing outer cylinder 85 and a shallow loaded ball rolling face 87 formed on a bearing shaft 86 and can transmit the rotational torque acting between the two members.

According to the structures thus far described, the ball retainer is assembled by fitting the retainer body in the hollow portion of the bearing outer cylinder from one opening of the same and by fitting the annular piece from the other opening, so that its shape can be completely contoured with the shape of the hollow portion of the bearing outer cylinder. As a result, the ball turning races connecting the loaded ball guide races and the unloaded ball guide races are made deep throughout their lengths so that the balls can roll smoothly in array within the ball turning races. As a result, the balls are prevented from coming out of the predetermined track in the ball turning races and from clogging the races so that their circulations can be smoothed to achieve the smooth sliding movements of the bearing outer cylinder.

What is claimed is:

1. A ball retainer fitted in the hollow portion of a bearing outer cylinder, which can move linearly around a bearing shaft, for retaining and arraying balls held between said bearing outer cylinder and said bearing shaft, comprising:

a retainer body including: a smaller-diameter portion adapted to be fitted in a loaded ball region of said bearing outer cylinder, which is formed with a plurality of axially extending ridges for holding said balls together with said bearing shaft; a larger-diameter portion formed at one end of said smaller-diameter portion and so fitted in a ball scoop region of said bearing outer cylinder adjacent to said loaded ball region that it is axially retained by said ridges; and a leading end portion formed at the other end of said smaller-diameter portion to have a diameter equal to or smaller than that of said smaller-diameter portion for forming a clearance with the inner circumference of said bearing outer cylinder in another ball scoop region of said bearing outer cylinder, said smaller-diameter portion being formed in its outer circumference with loaded ball guide races and unloaded ball guide races corresponding to loaded ball rolling faces and unloaded ball races, which are formed in the inner circumference of said bearing outer cylinder, said larger-diameter portion and said leading end portion being formed in its outer circumference with ball turning races for connecting said loaded ball guide races and said unloaded ball guide races in communication; and an annular piece formed with semicircular cut portions corresponding to said ball turning races and fixed on the outer circumference of the leading end portion of said retainer body for occupying the clearance between said leading end portion and the inner circumference of said bearing outer cylinder.

2. A ball retainer according to claim 1, wherein the loaded ball guide races of the smaller-diameter portion of said retainer body are formed at their two ends with tongues for scooping up the loaded balls having rolled therein to said ball turning races.

* * * * *